United States Patent
Takayanagi

(10) Patent No.: US 11,906,324 B2
(45) Date of Patent: Feb. 20, 2024

(54) CLEANING ROUTE DETERMINATION SYSTEM AND METHOD FOR DETERMINING CLEANING ROUTE

(71) Applicant: Panasonic Intellectual Property Management Co., Ltd., Osaka (JP)

(72) Inventor: Tetsuya Takayanagi, Osaka (JP)

(73) Assignee: Panasonic Intellectual Property Management Co. Ltd., Osaka (JP)

(*) Notice: Subject to any disclaimer, the term of this patent is extended or adjusted under 35 U.S.C. 154(b) by 349 days.

(21) Appl. No.: 17/330,493

(22) Filed: May 26, 2021

(65) Prior Publication Data
US 2021/0278239 A1    Sep. 9, 2021

Related U.S. Application Data

(63) Continuation of application No. PCT/JP2019/051001, filed on Dec. 25, 2019.

(30) Foreign Application Priority Data

Jan. 31, 2019  (JP) ................. 2019-015677

(51) Int. Cl.
*G01C 21/00* (2006.01)
*A47L 9/28* (2006.01)
*G05D 1/02* (2020.01)

(52) U.S. Cl.
CPC .......... *G01C 21/383* (2020.08); *A47L 9/2852* (2013.01); *G05D 1/0219* (2013.01); *A47L 2201/04* (2013.01); *G05D 2201/0215* (2013.01)

(58) Field of Classification Search
CPC .. G01C 21/206; G01C 21/38; G01C 21/3804; G01C 21/383; G01C 21/3856;
(Continued)

(56) References Cited

U.S. PATENT DOCUMENTS

| 9,380,922 B2* | 7/2016 | Duffley ............... A47L 11/4011 |
| 2005/0192707 A1* | 9/2005 | Park ..................... G05D 1/0272 |
| | | 700/259 |

(Continued)

FOREIGN PATENT DOCUMENTS

| JP | 9-222852 | 8/1997 |
| JP | 2005-205028 | 8/2005 |

(Continued)

OTHER PUBLICATIONS

Crouse et al. "Indoor Air Flow Analysis Based on Lattice Boltzmann Methods", Elsevier Science B.V., 2002 (Year: 2002).*

(Continued)

*Primary Examiner* — Russell Frejd
*Assistant Examiner* — Brandon Z Willis
(74) *Attorney, Agent, or Firm* — Wenderoth, Lind & Ponack, L.L.P.

(57) ABSTRACT

A cleaning route determination system includes an analyzer that analyzes behavior of airflow and particles inside a facility, a map generator that generates a dust accumulation map indicating one or more dust accumulation areas inside the facility and one or more dust amounts corresponding to the one or more dust accumulation areas, and a route calculator that determines a first route from second routes. Each of the second routes is a route for a cleaner to pass through, within a certain period of time, at least one of the one or more dust accumulation areas. A total amount indicating a sum of dust amounts corresponding to dust accumulation areas included the first route is largest among total amounts corresponding to the second routes, each of the total amounts indicating a sum of dust amounts corresponding to dust accumulation areas included in each of the second routes.

11 Claims, 12 Drawing Sheets

(58) Field of Classification Search
CPC ............ G01C 21/3859; G01C 21/3889; G01C 21/3896; G05D 1/0274; G05D 1/02; G05D 1/0219; G05D 1/0221; G05D 2201/0203; G05D 2201/0215; A47L 9/281; A47L 9/2826; A47L 9/2852; A47L 9/2857; A47L 11/24; A47L 11/28; A47L 11/10; A47L 11/32; A47L 13/38; A47L 2301/08; A47L 2201/04; A47L 2201/06
See application file for complete search history.

(56) References Cited

U.S. PATENT DOCUMENTS

| | | | | |
|---|---|---|---|---|
| 2012/0247510 | A1* | 10/2012 | Chen | G05D 1/0219 |
| | | | | 134/18 |
| 2019/0029486 | A1* | 1/2019 | Suvarna | A47L 9/2857 |
| 2020/0229669 | A1* | 7/2020 | Arnold | A47L 9/2826 |
| 2020/0275814 | A1* | 9/2020 | Jo | G05D 1/0274 |

FOREIGN PATENT DOCUMENTS

| | | |
|---|---|---|
| JP | 2012-154822 | 8/2012 |
| JP | 2013-230294 | 11/2013 |
| JP | 2017-204132 | 11/2017 |
| JP | 2018-086218 | 6/2018 |
| JP | 2018-109494 | 7/2018 |
| JP | 2018109494 | * 7/2018 |
| WO | 2010/109557 | 9/2010 |

OTHER PUBLICATIONS

Benra et al. "A Comparison of One-Way and Two-Way Coupling Methods for Numerical Analysis of Fluid-Structure Interactions", Hindawi Publishing Corporation, Nov. 3, 2011 (Year: 2011).*
English translation of Japanese publication No. 2018109494 (Year: 2018).*
International Search Report of PCT application No. PCT/JP2019/051001 dated Mar. 10, 2020.
Tetsuya Takayanagi et al., "Analysis of particle-laden flow at high mass loading through Lattice Boltzmann Method", 32nd Computational Fluid Dynamics Symposium, Dec. 12, 2018 (English Abstract).

* cited by examiner

CLEANING ROUTE DETERMINATION SYSTEM AND METHOD FOR DETERMINING CLEANING ROUTE

BACKGROUND

1. Technical Field

The present disclosure relates to a cleaning route determination apparatus and a method for determining a cleaning route.

2. Description of the Related Art

Use of floor cleaning techniques employing autonomous robots in large-scale commercial complexes typified by shopping malls are gaining attention in order to make up for the shortage of the future working population. In addition, as a result of rapid advances in technologies such as artificial intelligence (AI) and robotics, cleaning work performed by cleaning apparatuses is being automated in shopping centers with vast site areas. Development of AI and sensing technologies facilitates the automation of cleaning work performed by cleaning apparatuses especially in building structures with curved surfaces and complex building structures with a large number of obstacles, which are often the case in commercial facilities. Such a cleaning apparatus is provided with a camera and a sensor and capable of, if detecting an obstacle or the like during autonomous driving, autonomously collecting dust in a commercial facility while avoiding the obstacle or the like. Japanese Unexamined Patent Application Publication No. 2018-86218, for example, discloses a technique for controlling an autonomous cleaning apparatus. According to this example of the related art, the cleaning apparatus includes a distance sensor and uses a method for controlling traveling speed thereof in accordance with a distance to an object. With this technique, the cleaning apparatus can continue to perform cleaning work without stopping even when a distance between the cleaning apparatus and an object becomes smaller than or equal to a threshold.

A cleaning apparatus, however, needs to finish cleaning floors having a large area, namely thousands of square meters, for example, within a limited period of time such as several hours. In the example of the related art, a cleaning apparatus can efficiently perform cleaning work even when there are obstacles, but it is difficult for a cleaning apparatus to finish cleaning a large floor area in a commercial facility or the like within a certain period of time. Because the site area of a commercial facility, such as a shopping mall, into which a cleaning apparatus is introduced can be as large as tens of thousands of square meters, for example, the cleaning apparatus needs to efficiently clean an extremely large space within a limited period of time such as four to five hours at night. Since it is difficult for the cleaning apparatus to clean all areas to be cleaned, scheduling needs to be performed so that the cleaning apparatus can pass through as many priority areas as possible within a certain period of time.

SUMMARY OF THE INVENTION

One non-limiting and exemplary embodiment provides a technique for efficiently cleaning an inside of a facility with a vast site area within a certain period of time.

In one general aspect, the techniques disclosed here feature a cleaning route determination system including a calculation condition inputter that receives a calculation condition including information regarding an inside of a facility, an analyzer that analyzes, on a basis of the calculation condition, behavior of airflow and particles inside the facility, a map generator that generates, on a basis of a result of the analysis, a dust accumulation map indicating one or more dust accumulation areas inside the facility and one or more dust amounts corresponding to the one or more dust accumulation areas, and a route calculator that determines, on a basis of the dust accumulation map, a first route from second routes. Each of the second routes is a route for a cleaner to pass through, within a certain period of time, at least one of the one or more dust accumulation areas. A total amount indicating a sum of dust amounts corresponding to dust accumulation areas included the first route is largest among total amounts corresponding to the second routes, each of the total amounts indicating a sum of dust amounts corresponding to dust accumulation areas included in each of the second routes.

In the present disclosure, terms "particles" and "dust" will be used without particularly distinguishing between the two.

According to the present disclosure, a route for efficiently cleaning an inside of a facility with a vast floor area within a certain period of time can be determined.

It should be noted that this general or specific aspect may be implemented as an apparatus, a method, an integrated circuit, a computer program, a computer-readable storage medium, or any selective combination thereof. The computer-readable storage medium includes, for example, a nonvolatile storage medium such as a compact disc read-only memory (CD-ROM).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9 is a diagram illustrating an example of a method for displaying an optimal cleaning route and the like;

DETAILED DESCRIPTION

An embodiment will be specifically described hereinafter with reference to the drawings.

The embodiment that will be described hereinafter is a general or specific example. Values, shapes, materials, components, arrangement positions and connection modes of the components, steps, order of the steps, and the like mentioned in the following embodiment are examples, and do not limit the present disclosure. Among the components described in the following embodiment, ones not described in the independent claims, which define broadest concepts, will be described as optional components.

Figure 1:
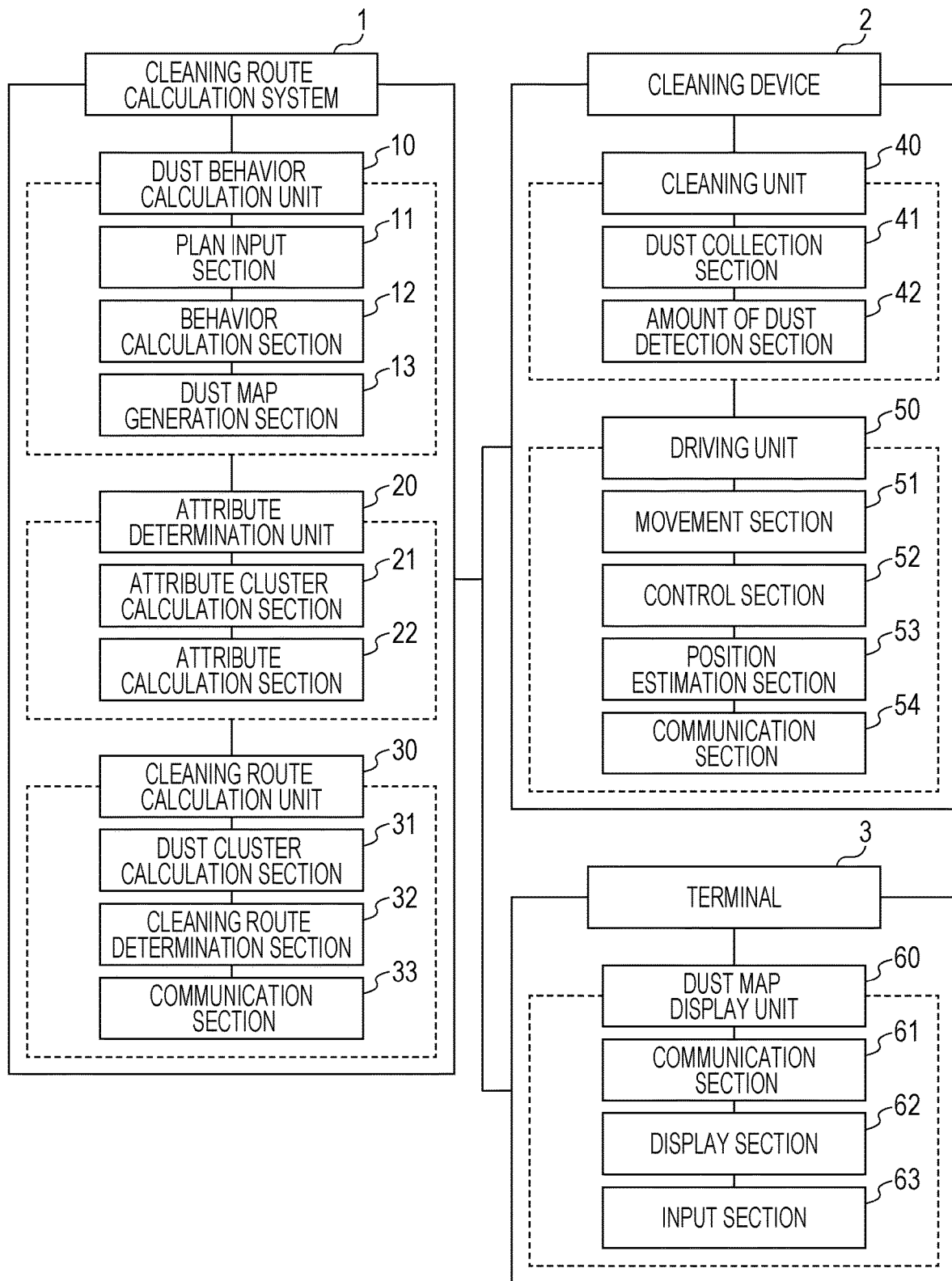
FIG. 1 is a diagram illustrating an example of a system configuration according to an embodiment.

FIG. 1 is a diagram illustrating an example of a system configuration according to the present embodiment. An example of the present embodiment includes a cleaning route calculation system 1, a cleaning device 2, and a terminal 3.

The cleaning route calculation system 1 includes a dust behavior calculation unit 10, an attribute determination unit 20, and a cleaning route calculation unit 30. The dust behavior calculation unit 10 includes a plan input section 11, a behavior calculation section 12, and a dust map generation section 13. The attribute determination unit 20 includes an attribute cluster calculation section 21 and an attribute calculation section 22. The cleaning route calculation unit 30 includes a dust cluster calculation section 31, a cleaning route determination section 32, and a communication section 33.

The cleaning device 2 includes a cleaning unit 40 and a driving unit 50. The cleaning unit 40 includes a dust collection section 41 and an amount of dust detection section 42. The driving unit 50 includes a movement section 51, a control section 52, a position estimation section 53, and a communication section 54.

The terminal 3 includes a dust map display unit 60. The dust map display unit 60 includes a communication section 61, a display section 62, and an input section 63.

The components will be described hereinafter.

The cleaning route calculation system 1 analyzes behavior of airflow and particles in order to identify areas inside a facility where dust has accumulated. The cleaning route calculation system 1 then generates a dust accumulation map indicating the areas inside the facility where dust has accumulated on the basis of a result of the analysis. The cleaning route calculation system 1 also performs calculations for dividing the areas inside the facility into clusters in accordance with characteristics of the areas. The cleaning route calculation system 1 then obtains an optimal cleaning route (optimal route) from information regarding the dust accumulation map and a result of the division of the areas inside the facility into the clusters. The cleaning route calculation system 1 transmits the obtained optimal cleaning route to the cleaning device 2.

The dust behavior calculation unit 10 is achieved by a central processing unit (CPU), a memory, and the like. The dust behavior calculation unit 10 is an example of a calculation condition inputter.

The plan input section 11 receives an input of a plan of a facility or the like. The plan input section 11 may also have a function of aiding generation of a plan, with which a user can generate a plan. The plan input section 11 is achieved by a memory, an input terminal, a touch panel, an image output screen, and the like. The plan input section 11 may perform operations using a CPU.

The behavior calculation section 12 performs calculations for simulations of airflow and particles inside a facility in order to calculate behavior of dust. The behavior calculation section 12 is an example of an analyzer.

The dust map generation section 13 generates a dust accumulation map indicating areas inside a facility where dust has accumulated on the basis of results of simulations of airflow and particles inside the facility performed by the behavior calculation section 12. The dust map generation section 13 may include an output terminal. The dust map generation section 13 is an example of a map generator.

The attribute determination unit 20 is an example of a classifier.

The attribute cluster calculation section 21 clusters passages and/or rooms inside a facility using, for example, an algorithm for machine learning without training data. Any algorithm may be used insofar as a non-hierarchical cluster analysis can be conducted.

The attribute calculation section 22 classifies clusters into ones to be cleaned by a person and ones to be cleaned by the cleaning device 2 on the basis of a result of calculation performed by the attribute cluster calculation section 21. The clusters need not necessarily be classified into ones to be cleaned by a person and ones to be cleaned by the cleaning device 2. The clusters may be classified into three or more categories, instead.

The cleaning route calculation unit 30 is achieved by a CPU, a memory, and the like. The cleaning route calculation unit 30 is an example of a route calculation unit (route calculator).

The dust cluster calculation section 31 performs a cluster analysis on dust accumulation areas on the basis of a dust accumulation map generated by the dust map generation section 13. The dust accumulation areas are areas where dust has accumulated. The dust map generation section 13 performs the cluster analysis on dust accumulation areas using, for example, an algorithm for machine learning without training data.

The cleaning route determination section 32 obtains an optimal cleaning route (optimal route) on the basis of a result of the clustering of dust accumulation areas and information indicating the amount of dust accumulated in each of the dust accumulation areas received from the dust cluster calculation section 31 and information identifying clusters to be cleaned received from the attribute calculation section 22. The cleaning route determination section 32 may extract information including dust accumulation areas where the amount of dust accumulated is larger than or equal to a certain threshold from the information received from the dust cluster calculation section 31 and obtain a cleaning route through the dust accumulation areas, instead. With this configuration, cleaning can be performed more efficiently.

The communication section 33 transmits an optimal cleaning route (optimal route) obtained by the cleaning route determination section 32 to the cleaning device 2. The communication section 33 may transmit the optimal cleaning route (optimal route) obtained by the cleaning route determination section 32 to the terminal 3, instead. The communication section 33 is achieved by a transmitter, a receiver, and the like. The communication section 33 may also include a cable such as a local area network (LAN) cable and a network interface card (NIC) for a wireless LAN or the like. The communication section 33 may also include a wireless communication device.

The cleaning device 2 is an autonomous cleaning device. The cleaning device 2 may be an autonomous cleaning robot, instead.

The cleaning device 2 autonomously operates to clean an inside of a facility by collecting and removing dust. The cleaning device 2 may also perform wiping.

The cleaning unit 40 removes dust from floors or walls of a facility or the like.

The dust collection section 41 collects dust accumulating on floors or walls of a facility or the like through suction or the like. The dust collection section 41 is achieved by a suction device that sucks in dust, such as a vacuum cleaner.

The amount of dust detection section 42 measures the amount of dust collected by the dust collection section 41. The amount of dust detection section 42 includes a weight sensor. The weight sensor may be a load cell or an electromagnetic force restoration sensor. The amount of dust detection section 42 may also include various sensors in addition to the weight sensor.

The driving unit 50 is achieved by a power source for moving the cleaning device 2, such as a motor.

The movement section 51 has a function of moving the cleaning device 2. The movement section 51 is achieved by a power source such as a motor, wheels, and the like.

The control section 52 controls the entirety of the driving unit 50. The control section 52 is achieved by a CPU, a memory, and the like.

The position estimation section 53 estimates a position of the cleaning device 2 inside a facility. The position inside the facility may be a relative position or an absolute position. The position estimation section 53 is achieved by a memory, various sensors, and the like. The position estimation section 53 may perform operations using a CPU.

The communication section 54 receives an optimal cleaning route (optimal route) obtained by the cleaning route determination section 32 from the cleaning device 2. The communication section 54 may transmit information collected by the cleaning device 2 to the cleaning route calculation system 1 or the terminal 3. The communication section 54 is achieved by a transmitter, a receiver, and the like. The communication section 54 may also include a cable such as a LAN cable and an NIC for a wireless LAN. The communication section 54 may also include a wireless communication device.

The terminal 3 is a portable device having an input/output function. The terminal 3 displays a dust accumulation map and receives inputs to the dust accumulation map. The terminal 3 transmits input information and the like to the cleaning route calculation system 1 or the cleaning device 2. The terminal 3 also receives a dust accumulation map, information regarding a position of the cleaning device 2, and the like from the cleaning route calculation system 1 or the cleaning device 2. The terminal 3 may be a tablet terminal, a smartphone, a personal digital assistant (PDA), or the like.

The dust map display unit 60 displays a dust accumulation map generated by the dust map generation section 13 on the terminal 3.

The communication section 61 receives a dust accumulation map generated by the dust map generation section 13 from the communication section 33 included in the cleaning route calculation unit 30. The communication section 61 is achieved by a transmitter, a receiver, and the like. The communication section 61 may also include a cable such as a LAN cable and an NIC for a wireless LAN or the like. The communication section 61 may also include a wireless communication device.

The display section 62 displays a dust accumulation map generated by the dust map generation section 13 on a screen or the like. The display section 62 is achieved by an organic electroluminescent (EL) display or a liquid crystal display. The display section 62 may include a touch panel or the like.

The input section 63 receives information regarding a position of a cleaned dust accumulation area or the like. The information may be manually input on the terminal 3 or may be input from another device through wireless or wired communication. The input section 63 may include a CPU, a memory, a communication device, and a keyboard. The input section 63 may be achieved by a touch panel or the like.

Cleaning Route Calculation System

Functions of the components of the cleaning route calculation system 1 will be described in more detail.

The cleaning route calculation system 1 performs simulations of airflow and particles inside a facility. The cleaning route calculation system 1 may be provided in a server. The facility is, for example, a commercial facility. The dust map generation section 13 generates a dust accumulation map indicating areas where dust has accumulated on the basis of a result of the simulations. The areas are then classified in accordance with characteristics inside the facility, and an attribute indicating whether a person or a robot is to perform cleaning is given to each of the areas. The cleaning route calculation unit 30 calculates, from the output dust accumulation map, an optimal route for the cleaning device 2 to go around, within a certain period of time, the areas where dust has accumulated. The number of areas may be at least one, but may be two or more, instead.

The dust behavior calculation unit 10 generates a calculation model for calculating behavior of dust inside the facility. In order for the dust behavior calculation unit 10 to determine information identifying positions and shapes of passages inside the facility and/or information identifying positions and shapes of rooms inside the facility, the plan input section 11 reads facility plan information such as three-dimensional computer-aided design (CAD) data. When there is no CAD data available to the plan input section 11, the plan input section 11 activates a plan input aiding application on a server, and the user can generate a plan.

The facility plan information or the plan may include information identifying positions and shapes of passages inside the facility and/or information identifying positions and shapes of rooms inside the facility.

Figure 2:
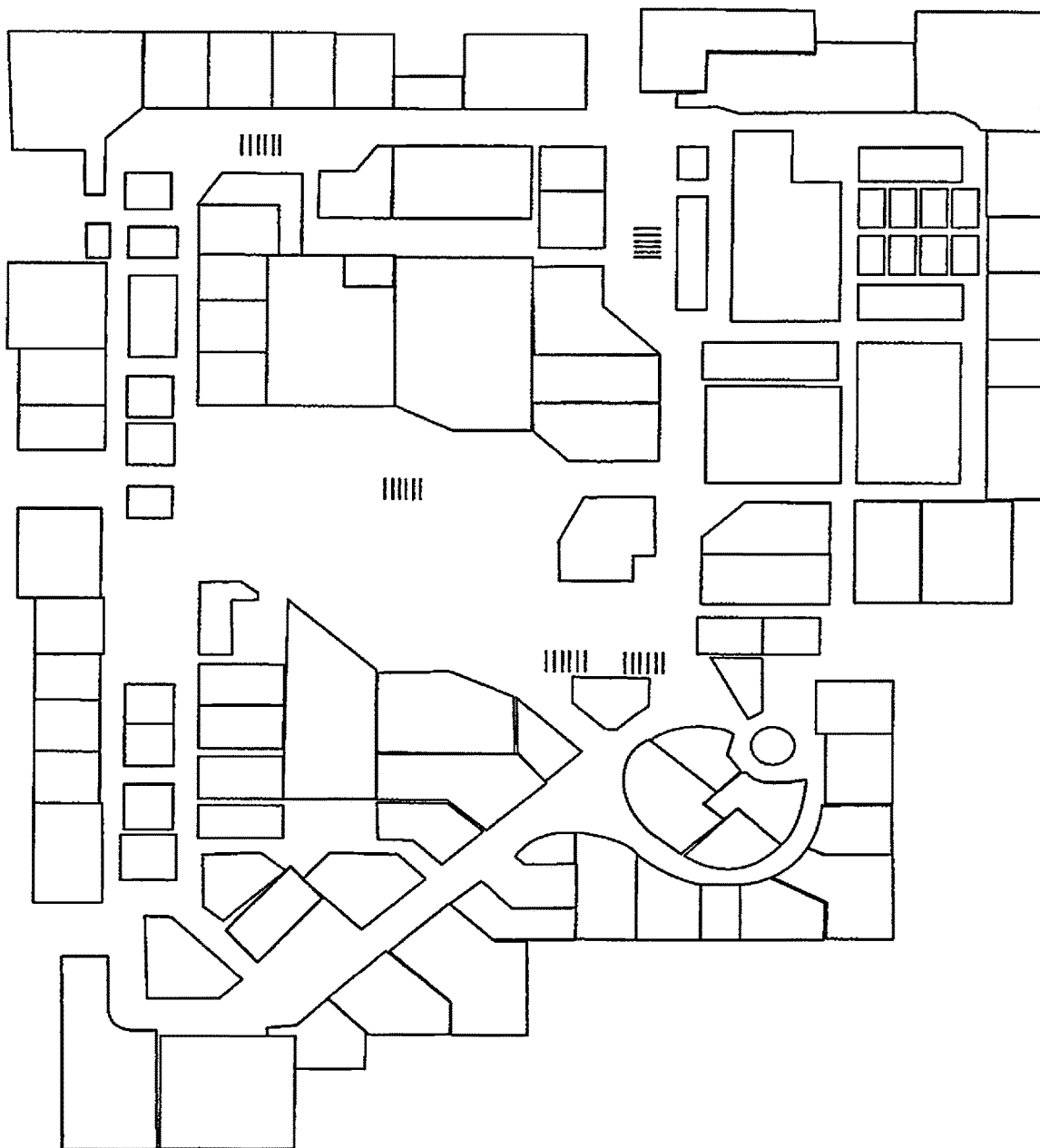
FIG. 2 is a diagram illustrating an example of a plan indicating positions and shapes of passages and rooms inside a facility.

FIG. 2 is a diagram illustrating an example of a plan indicating positions and shapes of passages and rooms inside a facility. When the plan input section 11 receives the plan using any of the above methods, the dust behavior calculation unit 10 receives positional information regarding facility doorways, air vents, air conditioners, stairways, and the like inside the facility in order to determine boundary conditions to be set for the calculation model.

Figure 3:
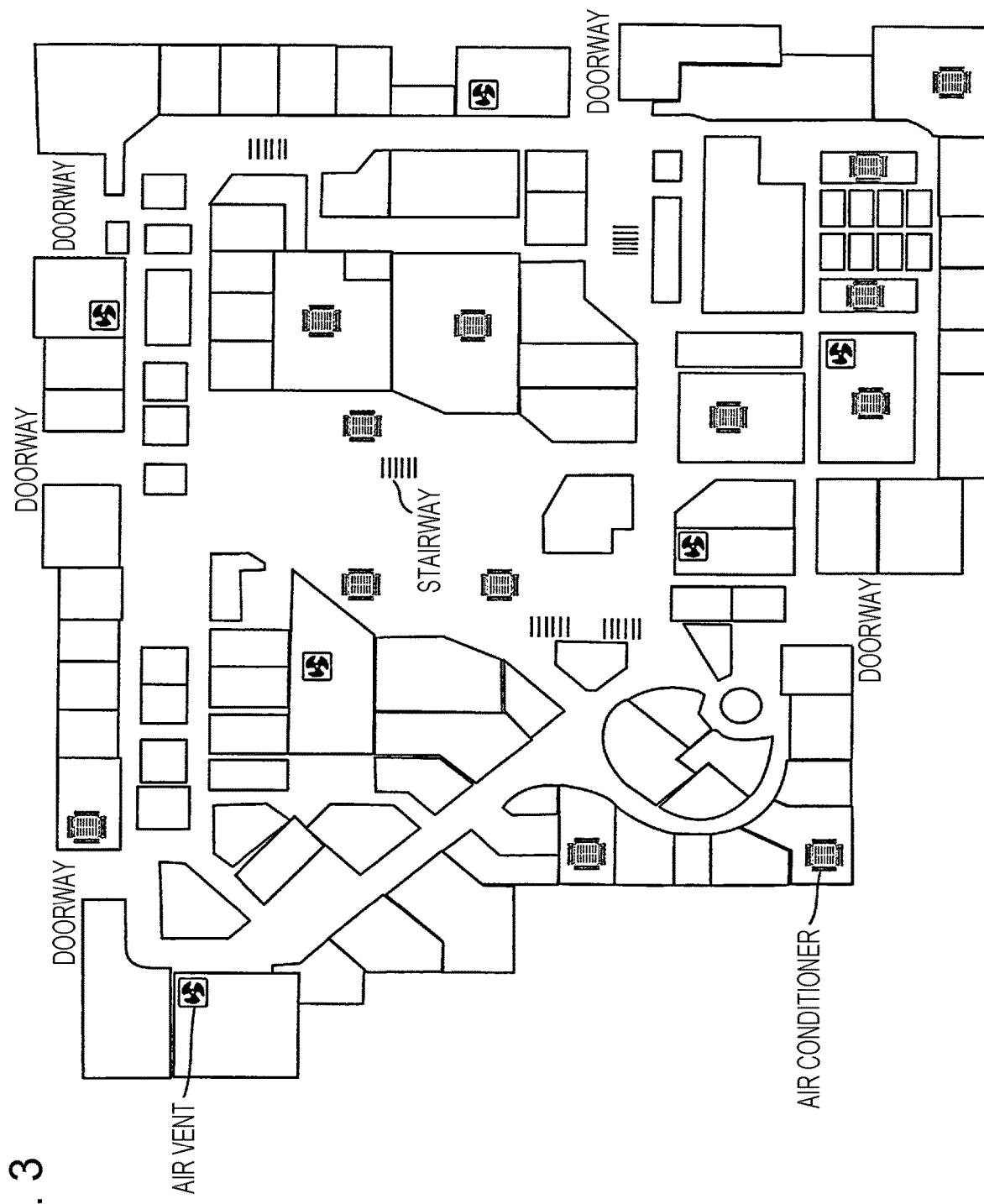
FIG. 3 is a diagram illustrating an example of facility plan information in which positions of facility doorways, air vents, air conditioners, and stairways have been set.

FIG. 3 is a diagram illustrating an example of facility plan information in which positions of facility doorways, air vents, air conditioners, and stairways have been set. Because dust enters from the outside of the facility, the number of particles flowing in and out of the facility varies depending on the positions of the facility doorways and the air vents connecting to the outside. At this time, the dust behavior calculation unit 10 may determine the number of particles on the basis of the number of times that doors at the doorways have been opened and closed per day, which is measured by sensors provided for the doors. The cleaning route calculation system 1 thus improves accuracy of a simulation indicating behavior of dust.

When sensors provided for the doors at the doorways are not available, the dust behavior calculation unit 10 may calculate an average number of times that the doors have been opened and closed on the basis of an average number of visitors per day and determine an average concentration of particles flowing in and out of the facility on the basis of the average number of times. At this time, the dust behavior calculation unit 10 may use a general concentration of particles as a default value of the concentration of particles outside the facility, but may determine the concentration of particles outside the facility on the basis of information regarding prediction of particulate matter 2.5 (PM2.5) distribution in a local area published on the Internet or the like, instead. When the dust behavior calculation unit 10 uses the information regarding the prediction of PM2.5 distribution in the local area published on the Internet, the accuracy of the simulation indicating the behavior of dust improves.

There are two boundary conditions of wind speed at the facility doorways used as boundary conditions for determining the concentration of particles flowing in and out of the facility, namely wind speed of natural convection from the outside of the facility and wind speed of airflow (airflow speed) induced by human walking (human movement). The cleaning route calculation system 1 measures the wind speed of natural convection from the outside of the facility, for example, before the facility opens or sets a general wind speed as a default value. Alternatively, the user may set any wind speed for the dust behavior calculation unit 10. The dust behavior calculation unit 10 determines the wind speed of airflow induced by human walking (human movement) on the basis of a general walking speed of humans. Effective particle inflow/outflow conditions at the facility doorways are determined from these two elements. When the dust behavior calculation unit 10 constantly measures wind speed using wind speed sensors provided at the facility doorways, the effective particle inflow/outflow conditions can be directly measured.

The dust behavior calculation unit 10 also receives air inflow/outflow conditions at the air vents. When the dust behavior calculation unit 10 can use data regarding measurement of an environment of the facility, the dust behavior calculation unit 10 may set the data for the calculation model. When no data regarding measurement of the environment of the facility is available, the dust behavior calculation unit 10 detects wind speed using wind speed sensors as in the case of the facility doorways or determines wind speed by performing a simple simulation on the basis of set ventilation volumes of the air vents or the like.

Because wind direction, wind volume, and the like are set for the air conditioners in advance, the dust behavior calculation unit 10 sets the wind direction, the wind volume, and the like as boundary conditions.

Particles flow in and out between a floor, which is a target area of calculation, and another floor through the stairways. As in the case of the air vents, the dust behavior calculation unit 10 determines wind speed, which is a boundary condition, using data from wind speed sensors or the like.

Initial settings including the information identifying the positions and shapes of the passages inside the facility and/or the information identifying the positions and shapes of the rooms inside the facility and the boundary conditions may be made when simulation is performed for the first time. In second and later simulations, the settings need not be set again. The wind speed and the particle inflow/outflow conditions, however, may be automatically updated on the basis of sensor information and/or information obtained from the Internet. The above method reduces a burden on the user.

After the information identifying the positions and shapes of the passages inside the facility and/or the information identifying the positions and shapes of the rooms inside the facility and the boundary conditions are determined, first, the dust behavior calculation unit 10 conducts an airflow analysis to analyze airflow inside the facility. Commercial software or a self-made program of computational fluid dynamics (CFD) based on a finite element method and/or a finite volume method may be used for the airflow analysis. When calculation is performed for a large area such as a commercial complex, a turbulence model such as a k-ε model may be used in order to reduce a calculation load. In addition, because the calculation needs to be completed in a realistic period of time, parallelization employing a CPU and/or a graphics processing unit (GPU) may be performed in the cleaning route calculation system 1. At this time, a lattice Boltzmann method may be used as an algorithm suitable for the parallelization. When parallelization is performed using a GPU and calculation is performed using a lattice Boltzmann method, the calculation in the cleaning route calculation system 1 becomes more than a thousand times faster than sequential calculation performed by a common single-core CPU. The dust behavior calculation unit 10, therefore, can complete the calculation in a relatively short period of time.

After the calculation for the airflow analysis is completed, the dust behavior calculation unit 10 calculates behavior of particles on the basis of calculated airflow in order to generate a dust accumulation map. When the behavior of particles is analyzed, the dust behavior calculation unit 10 uses a model called a "one-way model", where force exerted on particles is determined on the basis of airflow. With this method, the dust behavior calculation unit 10 can reduce a calculation load. Data regarding airflow used in the one-way model may be data obtained in the airflow analysis. When analyzing particles, the dust behavior calculation unit 10 uses forces such as drag and gravity as boundary conditions. When coupling a particle analysis and a thermo-fluid analysis with each other, the dust behavior calculation unit 10 uses a force such as buoyancy as a boundary condition. Because typical particle size distribution and concentration can be different between areas, the dust behavior calculation unit 10 determines particle size distribution and concentration while, for example, referring to information available on the Internet. Alternatively, the user may manually set information regarding particle size and/or concentration. The dust behavior calculation unit 10 may use a particle size of 2.5 μm and a particle concentration of 1,050 kg/m$^3$, for example, as default values of particle size and concentration.

The dust behavior calculation unit 10 conducts this particle analysis for a certain period of time such as a day and counts the number of particles that have settled on the floor of the facility within the certain period of time due to gravity sedimentation. As a result, the dust map generation section 13 can generate a dust accumulation map on the basis of a result of calculation performed by the dust behavior calculation unit 10.

Figure 4:
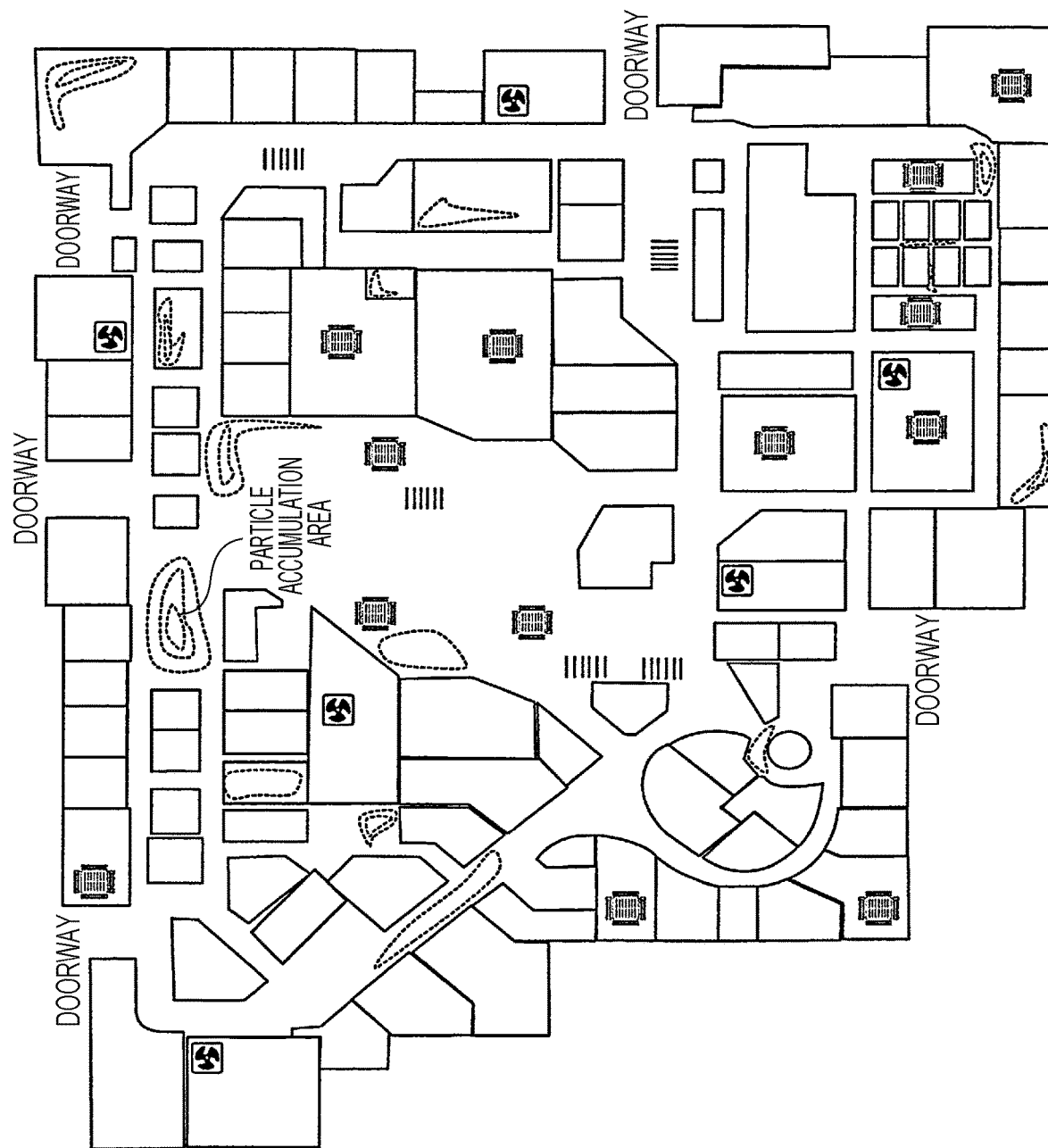
FIG. 4 is a diagram illustrating an example of a dust accumulation map at a time when a particle simulation has been performed under certain conditions in the example of the facility plan information in which the positions of the facility doorways, the air vents, the air conditioners, and the stairways have been set.

FIG. 4 is a diagram illustrating an example of a dust accumulation map at a time when a particle simulation has been performed under certain conditions in the example of the facility plan information in which the positions of the facility doorways, the air vents, the air conditioners, and the stairways have been set. The number of particles accumulated is indicated by contour lines, and the user of the cleaning route calculation system 1 can understand in advance from this map areas inside the facility to be cleaned. The dust behavior calculation unit 10 performs the particle simulation at certain time intervals, namely every twelfth day, for example, to update the dust accumulation map. In this case, the dust accumulation map is updated by adding calculated values of a dust accumulation map obtained as a result of a current simulation to initial values, which are a dust accumulation map obtained as a result of a previous simulation. The dust behavior calculation unit 10 transmits the generated dust accumulation map to the cleaning route calculation unit 30. The dust map generation section 13 may transmit the generated dust accumulation map to the terminal 3 through the communication section 33.

Next, the attribute cluster calculation section 21 of the attribute determination unit 20 performs a cluster analysis on the passages and/or the rooms inside the facility. The attribute cluster calculation section 21 uses one of various algorithms for the clustering, such as k-means clustering, a support-vector machine, and random forests, which are algorithms for machine learning without training data. Information indicating planar shapes and the positions of the rooms inside the facility and information indicating planar shapes and the positions of the passages inside the facility may be input to the algorithm, and the algorithm may output indices of the rooms and the passages.

Figure 5:
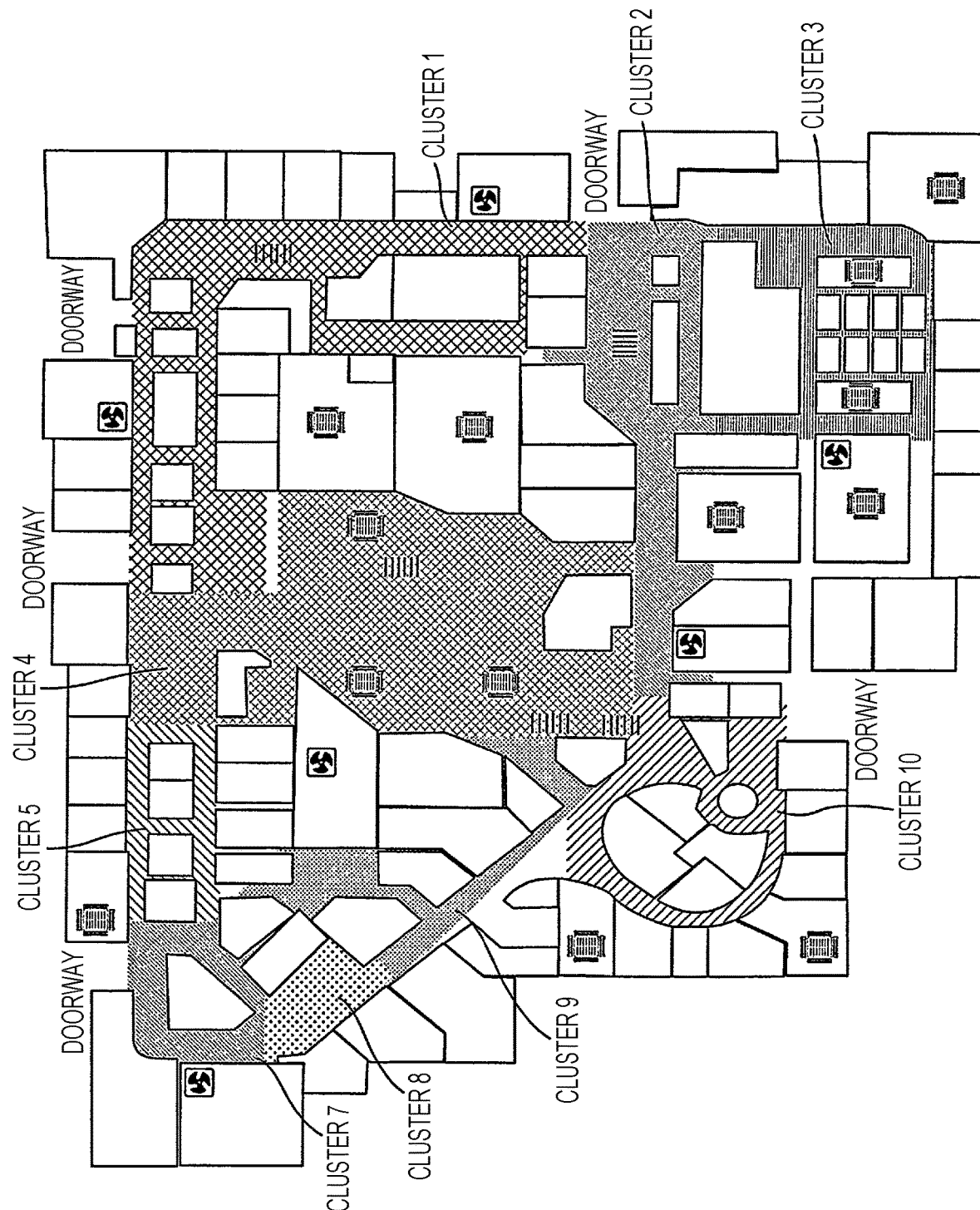
FIG. 5 is a diagram illustrating an example of clustering.

FIG. 5 is a diagram illustrating an example of the clustering. It can be seen from FIG. 5 that the attribute cluster calculation section 21 has performed the cluster analysis on the passages inside the facility in accordance with the width of the passages and the number of corners. Although the rooms have not been subjected to a cluster analysis for the sake of simplicity, areas inside the facility other than the passages, such as stores and toilets, may also be subjected to a cluster analysis.

Next, the attribute cluster calculation section 21 gives a result of the clustering to the attribute calculation section 22, and the attribute calculation section 22 determines whether a person or the cleaning device 2 is to clean each of the clusters in accordance with characteristics of the cluster. Robotics technologies and sensing technologies do not have sufficient accuracy for the cleaning device 2 to move around and detect obstacles. For this reason, the cleaning device 2 might knock products off shelves while cleaning areas where products are displayed. In addition, in an area where the cleaning device 2 need not cover a long distance but there are a lot of corners, such as Cluster 3 illustrated in FIG. 5, the cleaning device 2 needs to turn every corner, which takes time. Wide passages, on the other hand, include few obstacles and occupy most of the area of the commercial facility. The cleaning device 2 can efficiently clean such areas.

The attribute calculation section 22 determines an attribute of each of the clusters in accordance with the characteristics of the cluster and provides attribute information indicating the attribute to the cluster. The attribute calculation section 22 excludes clusters not to be cleaned by the cleaning device 2 from all the clusters, and gives information identifying clusters to be cleaned by the cleaning device 2 to the cleaning route determination section 32. The information identifying the clusters to be cleaned by the cleaning device 2 may be information identifying robot cleaning areas illustrated in FIG. 6. The information identifying the clusters to be cleaned by the cleaning device 2 may be a set of pieces of information identifying Clusters 1 and 2 and 4 to 10 illustrated in FIG. 5, that is, pieces of information identifying Clusters 1 and 2 and pieces of information identifying Cluster 4 to 10. When a plan identifying a structure inside the facility (i.e., the positions and shapes of the passages inside the facility and/or the positions and shapes of the rooms inside the facility) is drawn in two dimensions, information identifying Cluster i may be a set of pieces of information indicating coordinates included in Cluster i in the plan. In this case, the cleaning route calculation unit 30 can calculate an optimal cleaning route (optimal route), with which cleaning work becomes effective, while avoiding local optima.

Figure 6:
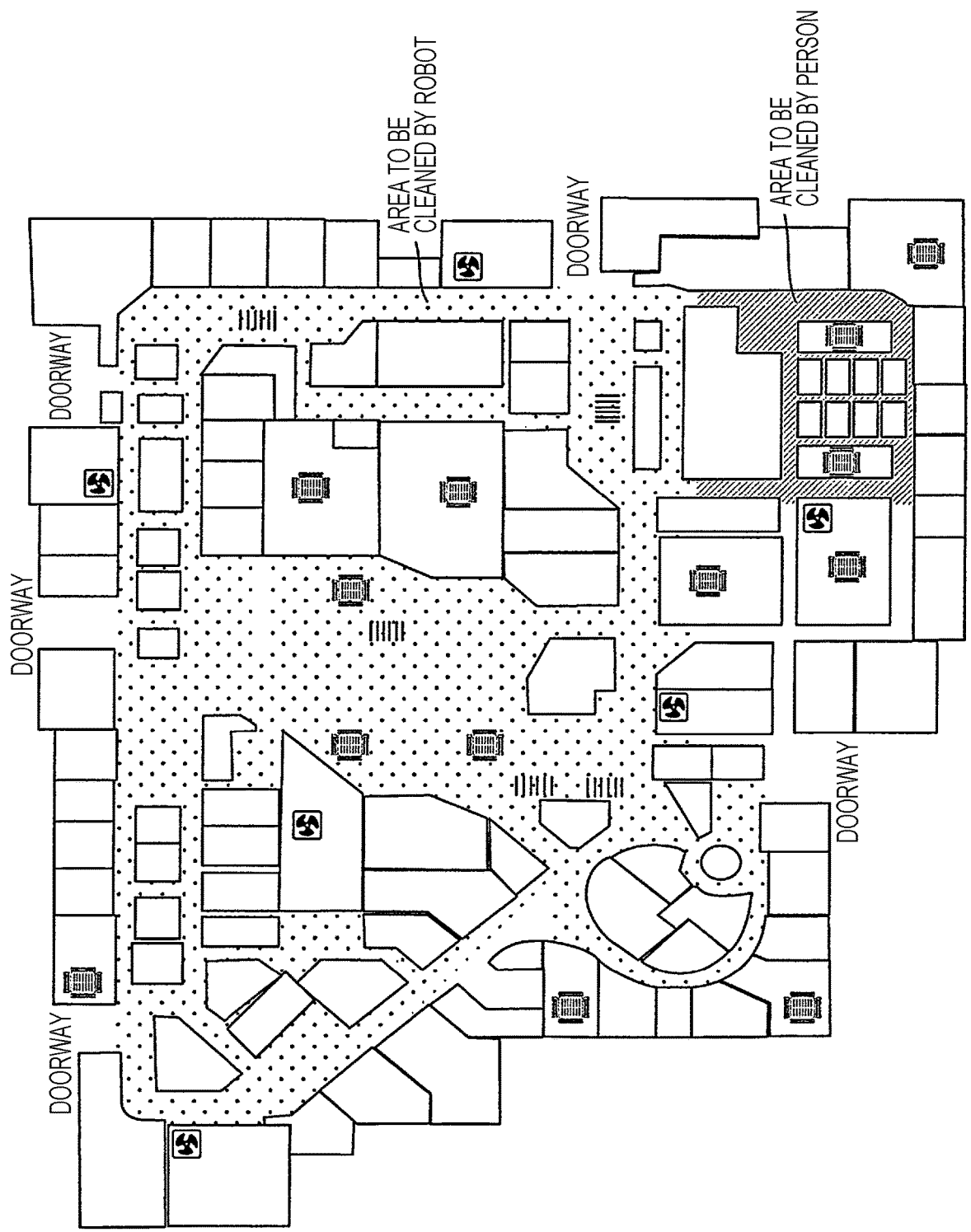
FIG. 6 is a diagram illustrating an example of areas to be cleaned by a robot and an area to be cleaned by a person, which reflect a result of a determination as to attributes made by an attribute calculation section.

FIG. 6 is a diagram illustrating an example of areas to be cleaned by a robot and an area to be cleaned by a person, which reflect a result of the determination as to attributes made by the attribute calculation section 22.

The attribute calculation section 22 determines attributes as follows in view of characteristics of the commercial facility.

1. Inside Store

Inside a store, the cleaning device 2 might knock products off shelves during cleaning. For this reason, a person should clean an area inside a store. If a cluster is a store, the attribute calculation section 22 determines that the cluster is an area to be cleaned by a person. That is, the attribute calculation section 22 does not select the cluster as a cluster to be cleaned by the cleaning device 2.

2. Number of Corners Inside Area is Larger than or Equal to Threshold

When a cluster includes a lot of corners, the cleaning device 2 needs to turn many times in order to clean an area of the cluster. Even if a cleaning distance is short, it takes time for the cleaning device 2 to complete the cleaning in this case. For this reason, such an area is not suitable for cleaning by the cleaning device 2, and a person should clean the area. A threshold for the number of corners per area may be, for example, eight. If the number of corners included in an area of a cluster is larger than or equal to the threshold (e.g., eight), the attribute calculation section 22 determines that the cluster is an area to be cleaned by a person. That is, the attribute calculation section 22 does not select the cluster as a cluster to be cleaned by the cleaning device 2.

3. There is Only One Entrance and Width of Passage at Entrance is Smaller than or Equal to Threshold A toilet, for example, usually has only one entrance, and a passage at the entrance is narrow. For this reason, the cleaning device 2 might be stuck inside the toilet after entering the toilet. For this reason, when the width of a passage at an entrance of a closed area inside a facility is smaller than or equal to a threshold, a person, not the cleaning device 2, should clean the area. If the entrance is widened as a result of renovation, or if a passage becomes sufficiently wide as a result of renovation, however, the cleaning device 2 can clean the area. The threshold for the width of a passage may be, for example, 100 cm. If the number of entrances of a room included in a cluster is one and the width of a passage at the entrance of the room is smaller than or equal to the threshold (e.g., 100 cm), the attribute calculation section 22 determines that the cluster is an area to be cleaned by a person. That is, the attribute calculation section 22 does not select the cluster as a cluster to be cleaned by the cleaning device 2.

4. Width of Passage is Smaller than or Equal to Threshold

There might be narrow passages inside a facility. In order to avoid collision with walls, it is likely that the cleaning device 2 needs to turn many times in such passages. Such an area, therefore, is not suitable for cleaning by the cleaning device 2, and a person should clean the area. A threshold for the width of a passage may be 100 cm, for example, but may be 90 cm or the like, instead. If a minimum value of the width of a passage included in a cluster is smaller than or equal to the threshold (e.g., 90 cm), the attribute calculation section 22 determines that the cluster is an area to be cleaned by a person. That is, the attribute calculation section 22 does not select the cluster as a cluster to be cleaned by the cleaning device 2.

5. Areas Including Steps

When there is a step in a route, the cleaning device 2 might stop moving. Such an area is not suitable for cleaning by the cleaning device 2, and a person should clean the area. If there is a step in a cluster, the attribute calculation section 22 determines that the cluster is an area to be cleaned by a person. That is, the attribute calculation section 22 does not select the cluster as a cluster to be cleaned by the cleaning device 2.

6. Areas where Physical Distance from Cleaning Device 2 is Greater than or Equal to Threshold When the amount of dust accumulated in an area is sufficiently large, a cleaning route might include the area even if the area is distant from a starting point of the cleaning device 2. In this case, the amount of dust collected might be optimal, but the cleaning device 2 might not clean many other dust accumulation areas. If a distance between an area and a starting point of the cleaning device 2 is greater than or equal to a threshold, therefore, a person should clean the area. The threshold for the physical distance from the cleaning device 2 may be, for example, 700 m or the like in a straight line. If a distance between the center of gravity of a cluster and a starting point of cleaning is greater than or equal to the threshold (e.g., 700 m in a straight line), the attribute calculation section 22 determines that the cluster is an area to be cleaned by a person. That is, the attribute calculation section 22 does not select the cluster as a cluster to be cleaned by the cleaning device 2.

7. Bias of Particle Distribution in Cluster is Larger than or Equal to Threshold Even when the amount of dust accumulated is the same, the cleaning device 2 or a person can complete cleaning in a shorter period of time if dust is concentrated in a certain area in a cluster. If dust is accumulated evenly in a cluster, on the other hand, an area to be cleaned is large, and it takes time for a person or the cleaning device 2 to complete cleaning. In this case, the cleaning device 2 may clean the latter cluster in order to reduce a burden on cleaning staff. When a bias of particle distribution in a cluster is larger than or equal to a threshold, therefore, a person should clean the cluster. The attribute calculation section 22 may use a standard deviation of particle distribution in a cluster to determine a bias. If a bias of particle distribution in a cluster is larger than or equal to the threshold, the attribute calculation section 22 determines that the cluster is an area to be cleaned by a person. That is, the attribute calculation section 22 does not select the cluster as a cluster to be cleaned by the cleaning device 2.

8. Areas where Number of People Coming and Going is Larger than or Equal to Threshold The cleaning route calculation system 1 may estimate paths of flow in the facility on the basis of the number of visitors to the facility and/or each of stores. In this case, the cleaning route calculation system 1 uses the number of people coming and going on each floor or in each period of time for the estimation of the paths of flow in the facility. It is difficult for the cleaning staff to clean areas where a large number of people are coming and going while the facility is open due to crowding. The cleaning device 2, therefore, may clean such areas at night. If the number of people coming and going in a target area is larger than or equal to a threshold, the cleaning device 2 should clean the target area. If the number of people coming and going in a cluster is larger than or equal to the threshold, the attribute calculation section 22 determines that the cluster is an area to be cleaned by the cleaning device 2. That is, the attribute calculation section 22 selects the cluster as a cluster to be cleaned by the cleaning device 2.

9. Areas that do not Fall Under any of 1 to 7

Such an area should be cleaned by the cleaning device 2, not a person.

The rules described above are an example of the determination of an attribute, and other rules may be set as necessary. Calculations for the determination as to an attribute need not be performed more than once unless the information identifying the positions and shapes of the passages inside the facility and/or the information identifying the positions and shapes of the rooms inside the facility change due to renovation of the facility or the like.

Figure 7:
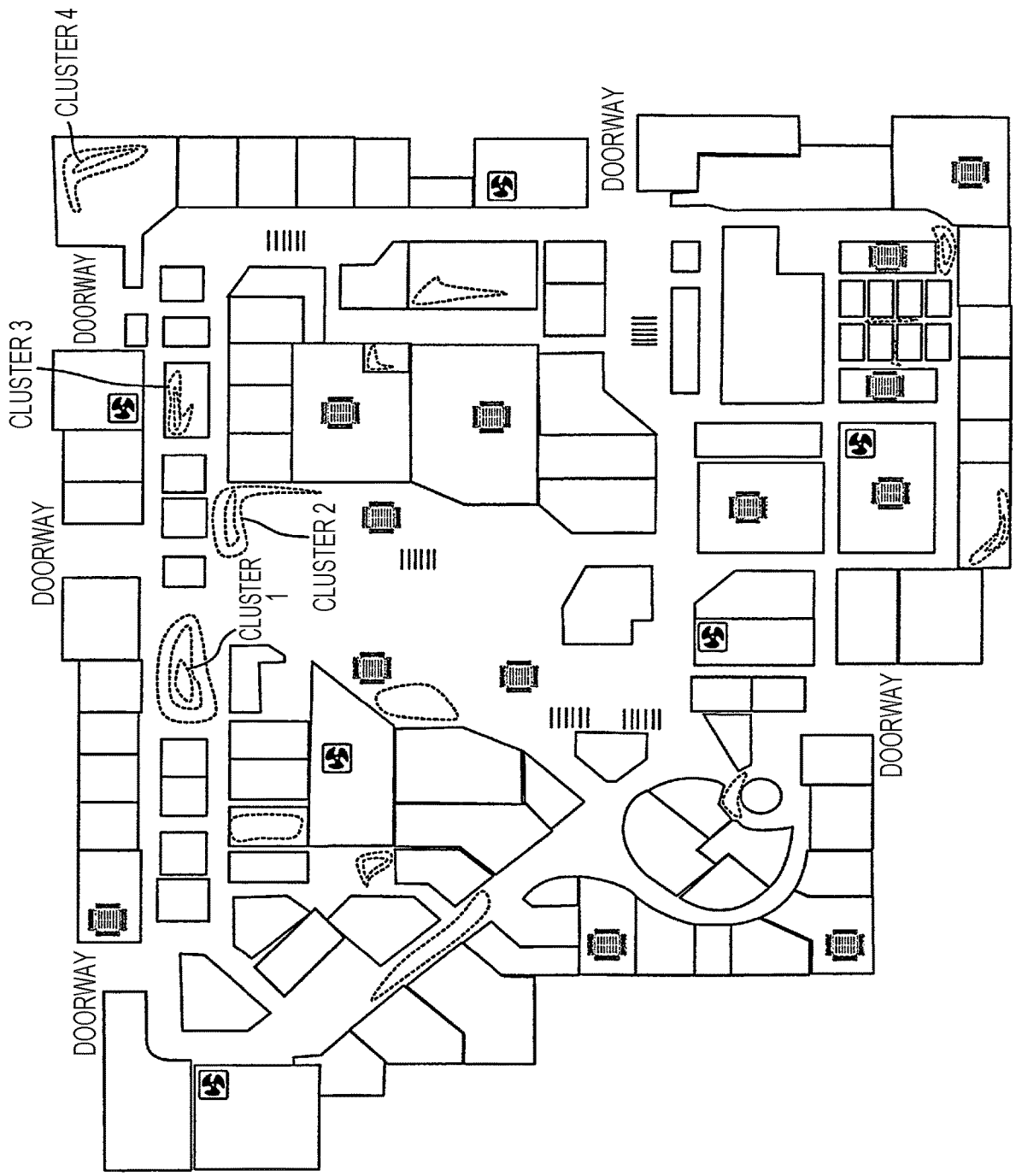
FIG. 7 is a diagram illustrating an example of a result of clustering of dust accumulation areas in the example of the dust accumulation map at the time when the particle simulation has been performed under the certain conditions in the example of the facility plan information in which the positions of the facility doorways, the air vents, the air conditioners, and the stairways have been set.

FIG. 7 is a diagram illustrating an example of a result of clustering of dust accumulation areas in the example of the dust accumulation map at the time when the particle simulation has been performed under the certain conditions in the example of the facility plan information in which the positions of the facility doorways, the air vents, the air conditioners, and the stairways have been set. The cleaning route calculation unit 30 gives the dust accumulation map obtained by the dust behavior calculation unit 10 to the dust cluster calculation section 31, and the dust accumulation areas are subjected to a cluster analysis. The dust cluster calculation section 31 uses one of various algorithms for the clustering, such as k-means clustering, a support-vector machine, and random forests, which are algorithms for machine learning without training data. Because each of the dust accumulation areas belongs to one of clusters as a result of the clustering, a discrete index is given to the dust accumulation area.

The result of the clustering of the dust accumulation areas performed by the dust cluster calculation section 31 may be {(information identifying a first dust accumulation area and an index of the first dust accumulation area), (information identifying a second dust accumulation area and an index of the second dust accumulation area), . . . }. When the plan indicating the structure inside the facility is drawn in two dimensions, information identifying an i-th dust accumulation area may be coordinates indicating the center of gravity of the area of an i-th cluster.

The dust cluster calculation section 31 may generate information obtained by adding information indicating the amount of dust accumulated in each of the dust accumulation areas to the result of the clustering of the dust accumulation areas. That is, the dust cluster calculation section 31 may generate information that is {(the information identifying the first dust accumulation area, the amount of dust accumulated in the first dust accumulation area, and the index of the first dust accumulation area), (the information identifying the second dust accumulation area, the amount of dust accumulated in the second dust accumulation area, and the index of the second dust accumulation area), . . . }.

The cleaning route determination section 32 determines a cleaning route on the basis of the result of the clustering of the dust accumulation areas and the information indicating the amount of dust accumulated in each of the dust accumulation areas received from the dust cluster calculation section 31 and information identifying clusters to be cleaned received from the attribute calculation section 22. The cleaning device 2 needs to clean the facility with a vast site area within a limited period of time, namely four to five hours. It is difficult for the cleaning device 2 to clean all the dust accumulation areas indicated in the dust accumulation map. The cleaning route determination section 32, therefore, solves an optimization problem for maximizing the amount of cleaning within the limited period of time. A large number of optimization algorithms are used for the optimization problem. Many of the optimization algorithms are discrete optimization methods, and discrete indices need to be given to the dust accumulation areas as determined by the dust cluster calculation section 31. The algorithms used by the cleaning route determination section 32 for the optimization problem include, for example, genetic algorithms, simulated annealing, and quantum annealing.

The cleaning route determination section 32 checks whether each of the pieces of information identifying the dust accumulation areas received from the dust cluster calculation section 31 is included in the information identifying the clusters to be cleaned received from the attribute calculation section 22. If the information identifying the clusters to be cleaned includes the information identifying each of the dust accumulation areas, a combination of the information identifying the dust accumulation area, the amount of dust accumulated in the dust accumulation area, and the index of the dust accumulation area is employed, and a set of combinations of information, namely {(a dust accumulation area 1 included in the clusters to be cleaned, the amount of dust accumulated in the dust accumulation area 1, and the index of the dust accumulation area 1 included in the clusters to be cleaned), (a dust accumulation area 2 included in the clusters to be cleaned, the amount of dust accumulated in the dust accumulation area 2, and the index of the dust accumulation area 2 included in the clusters to be cleaned), . . . }, is determined. The optimization algorithms are used using this set of information.

When an algorithm for performing continuous optimization is available instead of the above-mentioned discrete optimization methods, the cleaning route determination section 32 may perform route optimization using the algorithm. In this case, the cleaning route calculation unit 30 need not perform a cluster analysis on the dust accumulation areas.

When determining a cleaning route, the user inputs, to the cleaning route calculation system 1, a starting point of the cleaning device 2, a point at which the cleaning device 2 ends cleaning, and time required to finish the cleaning. The cleaning route determination section 32 solves a constraint discrete optimization problem using the above information and the optimization algorithms to obtain an optimization cleaning route for maximizing the amount of cleaning within a certain period of time. Here, "maximizing the amount of cleaning within a certain period of time" need not mean strict maximization. In the maximization, a value approximate to an ideal maximum value may be used. In addition, the maximization may be local maximization.

Figure 8:
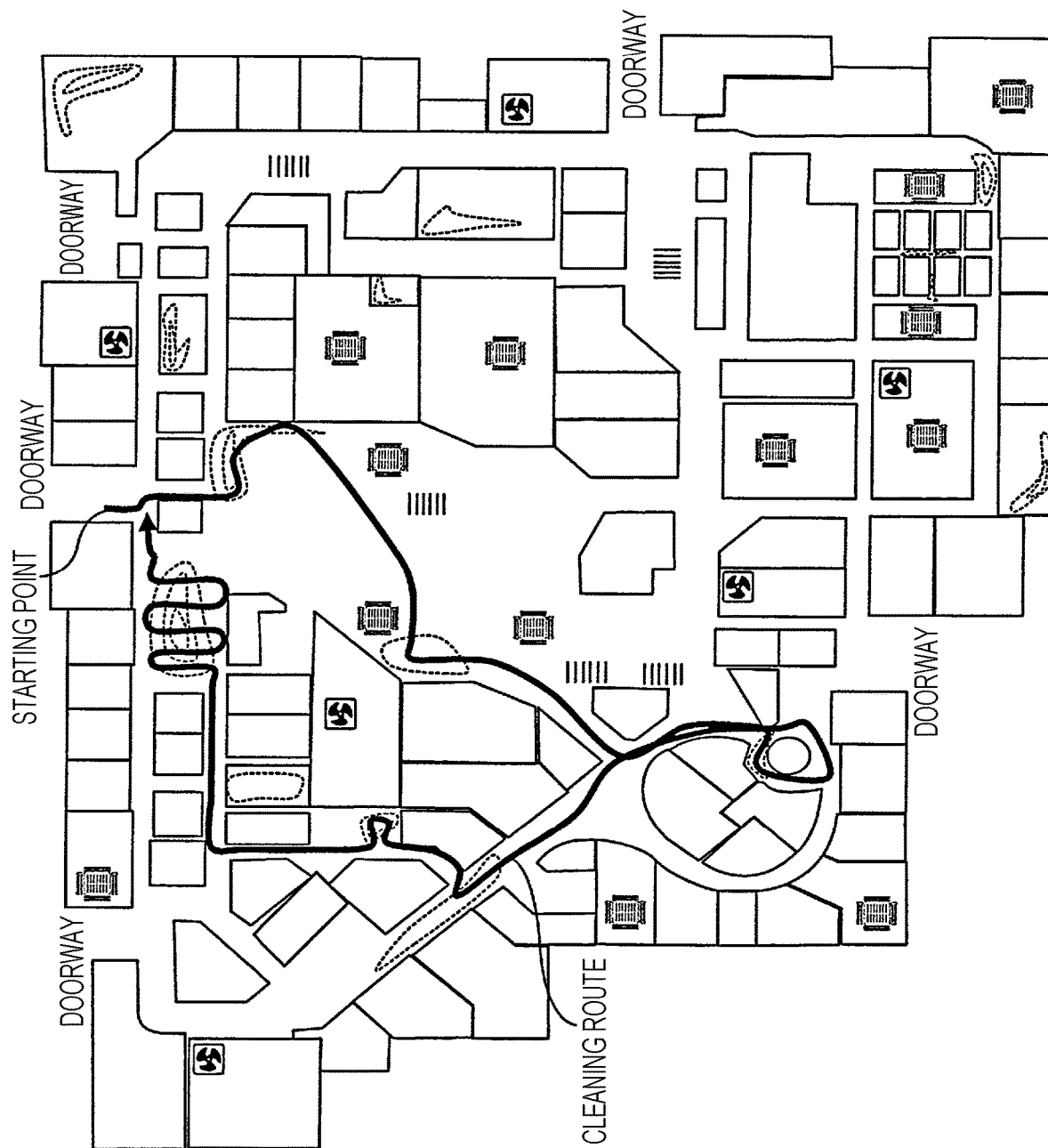
FIG. 8 is a diagram illustrating an example of a cleaning route determined using optimization algorithms on the basis of the example of the result of the clustering of the dust accumulation areas in the example of the dust accumulation map at the time when the particle simulation has been performed under the certain conditions in the example of the facility plan information in which the positions of the facility doorways, the air vents, the air conditioners, and the stairways have been set.

FIG. 8 is a diagram illustrating an example of a cleaning route determined using optimization algorithms on the basis of the example of the result of the clustering of the dust accumulation areas in the example of the dust accumulation map at the time when the particle simulation has been performed under the certain conditions in the example of the facility plan information in which the positions of the facility doorways, the air vents, the air conditioners, and the stairways have been set. Here, the cleaning route calculation unit 30 sets the same point as a starting point and an end point of the cleaning device 2. In FIG. 8 there is no route for cleaning all the dust accumulation areas within a limited period of cleaning time, and areas excluded from the cleaning route remain as areas to be cleaned by the cleaning staff. The obtained optimal cleaning route is transmitted to the cleaning device 2 through the communication section 33.

Cleaning Device

The cleaning device 2 includes the cleaning unit 40 and the driving unit 50. The cleaning unit 40 includes the dust collection section 41 that collects dust accumulated on the floors or the walls of the facility. The dust collected by the dust collection section 41 is stored in the dust collection section 41. The amount of dust detection section 42 inside the dust collection section 41 can measure the amount of dust collected.

The cleaning device 2 can move to a desired cleaning area using the driving unit 50. The movement section 51 is used to move the cleaning device 2 and is general transportation means such as wheels. The control section 52 controls the movement section 51, that is, the amount of rotation of the wheels and a direction of the cleaning device 2 (horizontal rotation), for example, to move the cleaning device 2 to a desired position. At this time, the position estimation section 53 reads rotation angles of the wheels and the cleaning device 2 and estimates a current position of the cleaning device 2 using this information as input information. A data assimilation algorithm such as a Kalman filter may be used for the estimation of the position of the cleaning device 2. The cleaning device 2 may include a light source such as a laser and estimate the position from the time of flight of light emitted from the laser, instead. The communication section 54 receives information regarding an optimal cleaning route calculated by the cleaning route calculation system 1 and transmits the information to the control section 52. The cleaning device 2 can perform cleaning work along the optimal cleaning route by combining together the received optimal cleaning route and a result of the estimation of the position of the cleaning device 2. Furthermore, the cleaning device 2 identifies areas inside the facility where dust has accumulated and the amount of dust accumulated using the amount of dust detection section 42. During the cleaning or when the cleaning has been completed, the cleaning device 2 transmits, to the cleaning route calculation system 1, information regarding areas actually cleaned thereby and the amount of dust collected thereby, which is detected by the amount of dust detection section 42. The dust map generation section 13 reflects, in the dust accumulation map, the information regarding the cleaned areas and the amount of dust collected. More specifically, the dust map generation section 13 may display, in the generated dust accumulation map, areas specified included in a cleaning route and actually cleaned by the cleaning device 2 differently from other areas. For example, the dust map generation section 13 may gray out or delete the areas cleaned by the cleaning device 2 in the dust accumulation map. The dust map generation section 13 may generate data with which the cleaned areas and areas that have not been cleaned are displayed differently in the dust accumulation map. The dust map generation section 13 may perform calculations for generating a dust accumulation map again on the basis of the information regarding the areas actually cleaned by the cleaning device 2 and the amount of dust collected transmitted from the cleaning device 2 to update the dust accumulation map. The updated dust accumulation map may be transmitted to the cleaning device 2 and the terminal 3 through the communication section 54 and the communication section 61, respectively.

Figure 9:
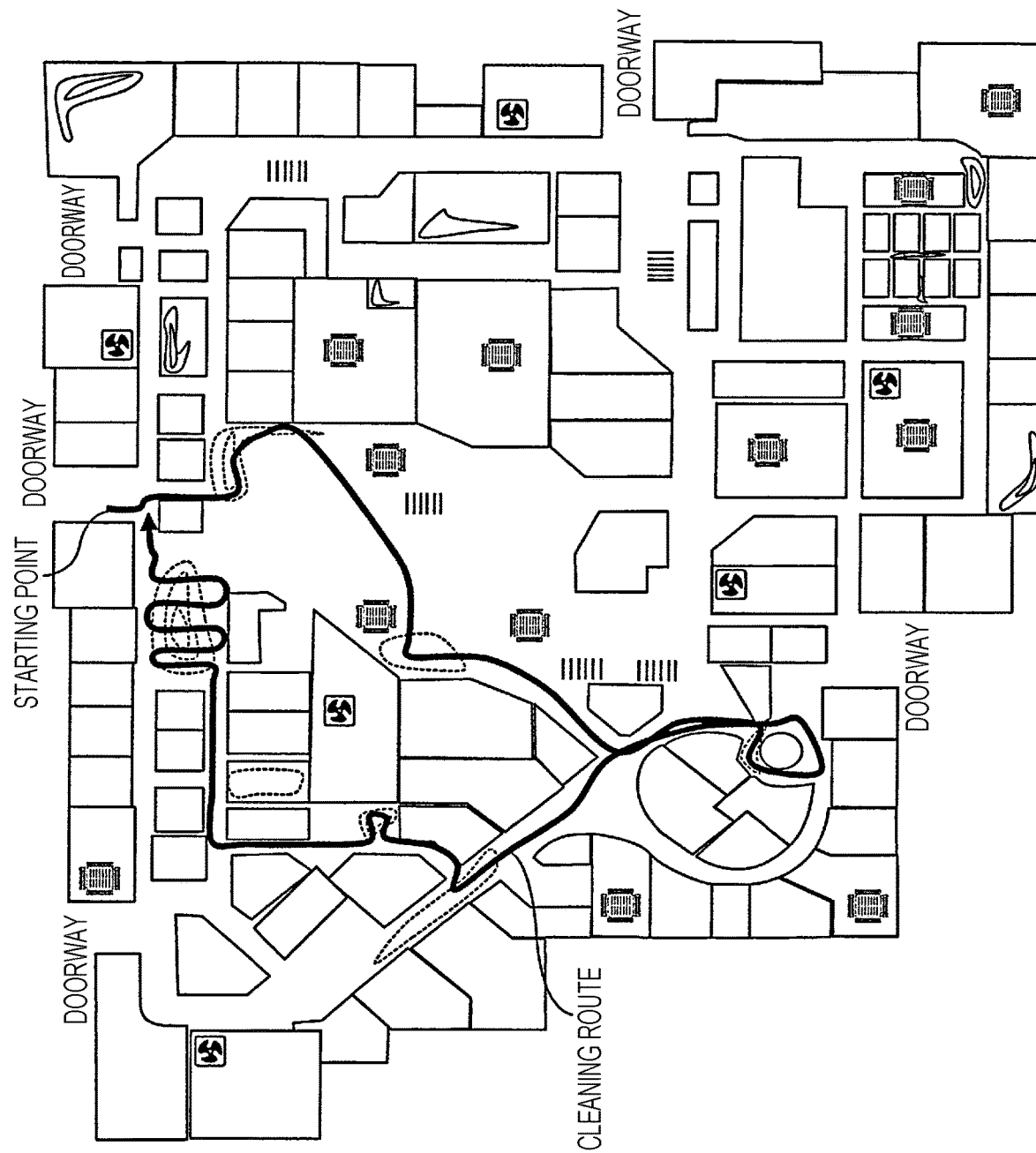

FIG. 9 is a diagram illustrating an example of a method for displaying an optimal cleaning route and the like. As illustrated in FIG. 9, the cleaning route calculation system 1 generates a dust accumulation map in which, for example, contour lines remain the same in the areas cleaned by the cleaning device 2 or on the cleaning route of the cleaning device 2 and are changed from broken lines to solid lines in the areas that have not been cleaned. The updated dust accumulation map is then transmitted to the terminal 3 or the cleaning route calculation system 1 through the communication section 33. The terminal 3 displays the updated dust accumulation map.

In doing so, the cleaning staff can identify, on the dust accumulation map, the cleaned areas and the areas that have not been cleaned, which increases cleaning efficiency of the cleaning staff.

Terminal

The terminal 3 is used by a manager of the commercial facility or the cleaning staff in the facility. The terminal 3 displays a dust accumulation map transmitted from the cleaning device 2 on the display section 62. For example, the cleaning device 2 performs cleaning at night, and the cleaning staff checks a dust accumulation map that reflects a result of the cleaning to identify areas to be cleaned thereby and then performs cleaning. In this case, the areas to be cleaned by the cleaning staff are visualized on the dust accumulation map. The terminal 3 also includes the input section 63 for reflecting a result of the cleaning performed by the cleaning staff. The cleaning staff inputs information regarding the areas cleaned thereby to the cleaning route calculation system 1 from the input section 63. The dust map generation section 13 sets the amount of dust remaining in the areas actually cleaned by the cleaning staff to zero on the dust accumulation map. As a result, latest information regarding dust accumulation areas is shown on the dust accumulation map, and the cleaning route calculation system 1 uses the latest information regarding the dust accumulation areas as an initial condition of a particle accumulation state in the particle simulation.

An overall process of the system will be described hereinafter with reference to a flowchart.

Cleaning Route Calculation System

Figure 10:
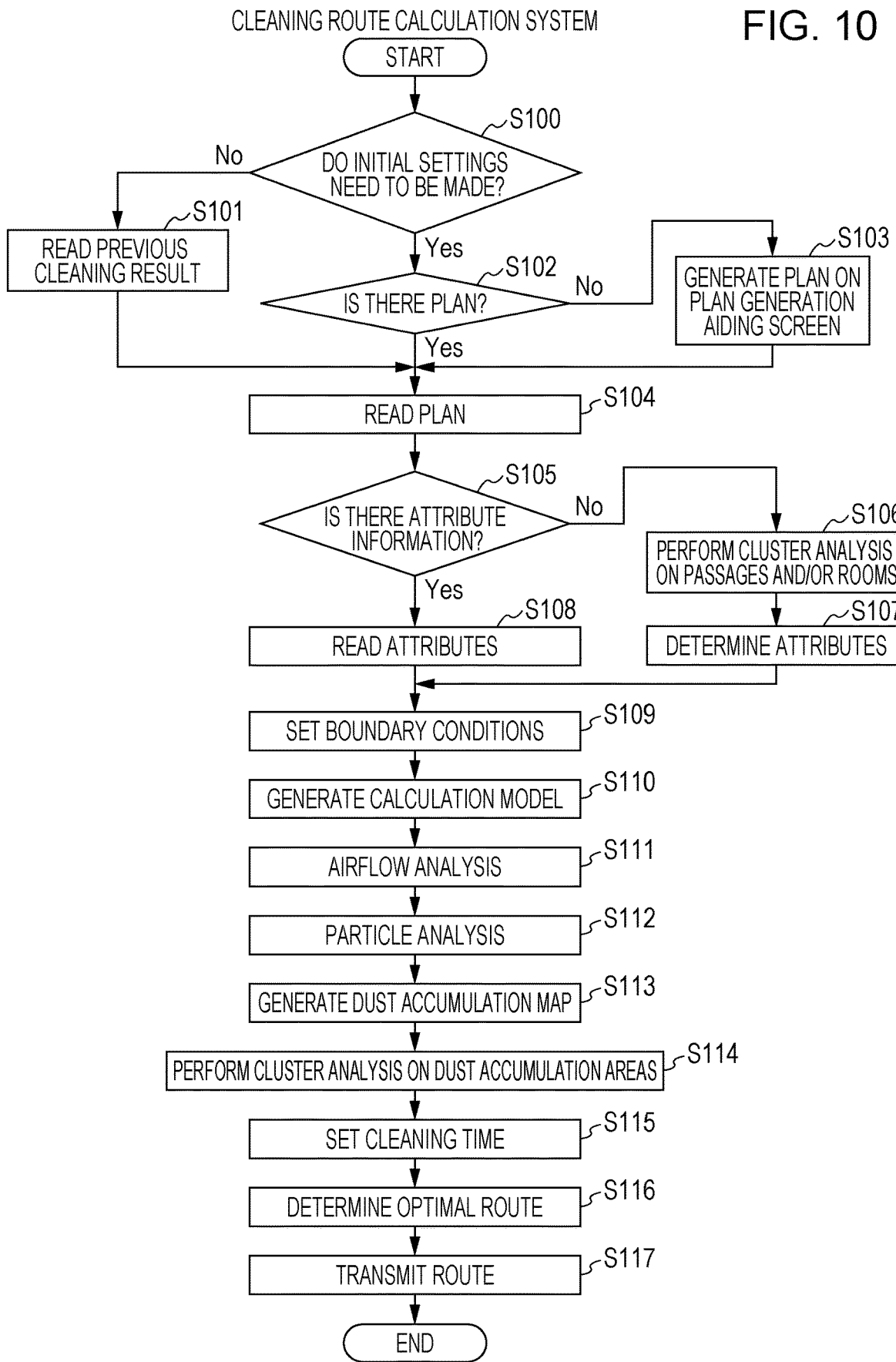
FIG. 10 is a flowchart illustrating a process performed by a cleaning route calculation system.

FIG. 10 is a flowchart illustrating a process performed by the cleaning route calculation system 1.

First, the cleaning route calculation system (cleaning route determination system) 1 is turned on and determines whether initial settings need to be made (step S100). If a cleaning route has been calculated and initial settings need not be made for the cleaning route calculation system 1 (NO in step S100) need not make initial settings, the cleaning route calculation system 1 reads an updated dust accumulation map that reflects a result of a previous cleaning operation (step S101). If there is no readable data regarding a result of a previous calculation or the like, that is, if there is no updated dust accumulation map, such as at an initial activation, and initial settings need to be made for the cleaning route calculation system 1 (YES in step S100), initial settings need to be made for the cleaning route calculation system 1.

Next, the plan input section 11 determines whether the plan input section 11 holds information identifying a structure inside a facility, that is, for example, facility plan information (step S102). If there is facility plan information (YES in step S102), the cleaning route calculation system 1 reads a plan (step S104). If there is no facility plan information (NO in step S102), the plan input section 11 activates a plan input aiding application on the server, and the user generates a plan using the plan input aiding application. The plan input section 11 reads the generated plan (step S103). When a plan is generated, a plan generation aiding screen is activated in the cleaning route calculation system 1, and the user generates a plan.

After the plan is read, whether attribute information indicating an attribute has been given to each of clusters (step S105). If attribute information has not been given (NO in step S105), the attribute cluster calculation section 21 performs a cluster analysis on passages and/or rooms inside the facility on the basis of the facility plan information (step in S106).

The attribute calculation section 22 determines an attribute of each of the clusters and gives attribute information indicating the attribute to the cluster (step S107). The attribute calculation section 22 determines, for the clusters, areas to be cleaned by the cleaning device 2 and areas to be cleaned by a person in accordance with characteristics of the clusters.

If there is attribute information (YES in step S105), the attribute calculation section 22 reads the attribute information (step S108). Step S108 may be performed immediately before step S116, which will be described later.

The behavior calculation section (analyzer) 12 sets boundary conditions such as positions of air vents, facility doorways, stairways, and air conditioners, wind (airflow) speeds, and pressures (step S109).

After setting the boundary conditions, the behavior calculation section 12 generates a calculation model from information identifying the positions and shapes of the passages inside the facility and/or the positions and shapes of the rooms inside the facility, and the boundary conditions (step S110).

The behavior calculation section 12 conducts an analysis of airflow inside the facility (step S111). After completing the airflow analysis, the behavior calculation section 12 couples a result of the airflow analysis and a model for analyzing behavior of particles with each other and conducts an analysis of behavior of particles (step S112). As a result, the behavior calculation section 12 can identify the behavior of particles inside the facility and areas where particles have accumulated on a floor.

After completing the particle analysis, the behavior calculation section 12 analyzes the number of particles that have gravitationally settled on the floor on the basis of a result of the particle analysis. The dust map generation section 13 generates a dust accumulation map on the basis of a result of the analysis (step S113). The dust cluster calculation section 31 performs a cluster analysis on dust accumulation areas using the dust accumulation map (step S114).

The cleaning route determination section 32 receives cleaning time input by the user for the cleaning device 2 (step S115). The cleaning route determination section 32 determines an optimal cleaning route (optimal route) on the basis of the cleaning time, a result of the clustering of the dust accumulation areas and the information indicating the amount of dust in each of the dust accumulation areas received from the dust cluster calculation section 31, and information identifying clusters to be cleaned received from the attribute calculation section 22 (step S116). That is, the cleaning route determination section 32 determines a route, which is an optimal solution to maximization of efficiency of cleaning work, under a condition that the cleaning device 2 passes through the dust accumulation areas within a certain period of time.

The cleaning route calculation system 1 then transmits the determined cleaning route (optimal route) to the cleaning device 2 (step S117).

Autonomous Cleaning Device

Figure 11:
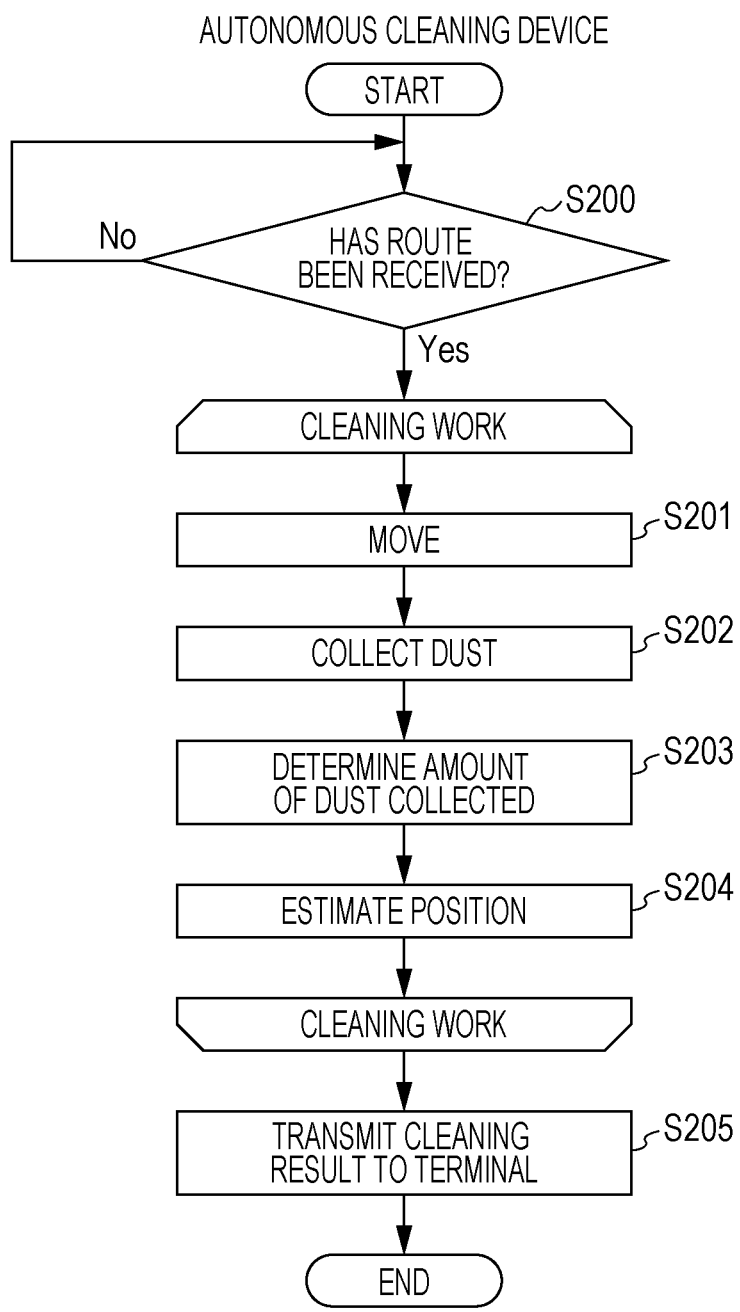
FIG. 11 is a flowchart illustrating a process performed by a cleaning device.

FIG. 11 is a flowchart illustrating a process performed by the cleaning device 2.

The cleaning device 2 determines whether the cleaning device 2 has received a route transmitted from the cleaning route calculation system 1 (step S200). If the cleaning device 2 has not received a route (NO in step S200), the cleaning device 2 continues to make the determination whether the cleaning device 2 has received a route. If the cleaning device 2 has received a route (YES in step S200), the cleaning device 2 starts cleaning work based on the received route.

Next, the cleaning device 2 moves to a point included in the cleaning route (step S201). The cleaning device 2 then collects dust accumulated in an area including the point (step S202).

The cleaning device 2 determines the amount of dust collected (step S203). The cleaning device 2 then estimates a current position thereof on the basis of the amount of rotation of the wheels included in the movement section 51 and a result of sensing performed by the various sensors included in the cleaning device 2 (step S204).

After completing the cleaning work, the cleaning device 2 transmits a result of the cleaning to the terminal 3 (step S205). Because it is assumed here that the cleaning device 2 is used at night, a final result is transmitted. When the cleaning device 2 is used during the day, however, a step of transmitting an intermediate result may be included.

Terminal

Figure 12:
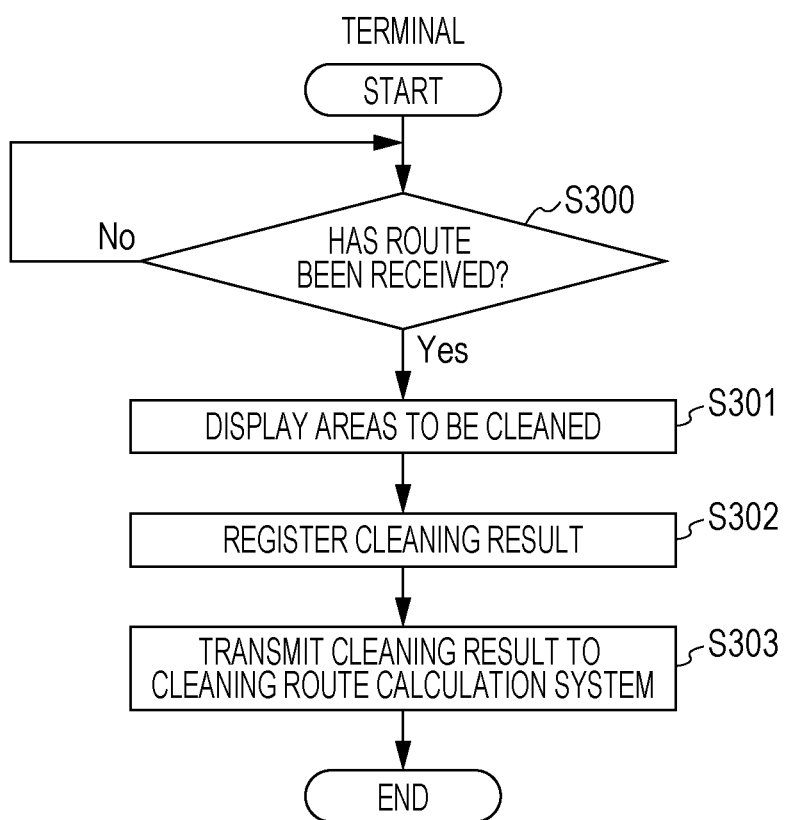
FIG. 12 is a flowchart illustrating a process performed by a terminal.

FIG. 12 is a flowchart illustrating a process performed by the terminal 3.

The terminal 3 displays a dust accumulation map that reflects a result of cleaning transmitted from the cleaning device 2. First, the terminal 3 receives an optimal cleaning route (optimal route) transmitted from the cleaning route calculation system 1 (step S300). Next, the terminal 3 displays areas to be cleaned, which are areas that have not been cleaned by the cleaning device 2 (step S301). The cleaning staff cleans the areas to be cleaned thereby, which are the areas that have not been cleaned by the cleaning device 2, and registers a result of the cleaning performed thereby to the terminal 3 (step S302). The terminal 3 transmits the result of the cleaning performed by the cleaning staff to the cleaning route calculation system 1 (step S303).

Advantageous Effects

A cleaning route determination system according to an aspect of the present disclosure includes a calculation condition inputter that receives a calculation condition including information regarding an inside of a facility, an analyzer that analyzes, on a basis of the calculation condition, behavior of airflow and particles inside the facility, a map generator that generates, on a basis of a result of the analysis, a dust accumulation map indicating one or more dust accumulation areas inside the facility and one or more dust amounts corresponding to the one or more dust accumulation areas, and a route calculator that determines, on a basis of the dust accumulation map, a first route from second routes. Each of the second routes is a route for a cleaner to pass through, within a certain period of time, at least one of the one or more dust accumulation areas. A total amount indicating a sum of dust amounts corresponding to dust accumulation areas included the first route is largest among total amounts corresponding to the second routes, each of the total amounts indicating a sum of dust amounts corresponding to dust accumulation areas included in each of the second routes.

As a result, the cleaning route determination system according to the aspect of the present disclosure identifies areas inside the facility where dust is likely to have accumulated and determines a route for maximizing the amount of dust collected within the certain period of time in one or more of the identified areas where dust is likely to have accumulated. The cleaner can efficiently clean the inside of the facility by performing cleaning along the route.

The cleaning route determination system according to the aspect of the present disclosure further includes a terminal. The map generator may update the dust accumulation map on a basis of information regarding a dust amount in a cleaned area. The terminal may receive the updated dust accumulation map. The terminal may display the updated dust accumulation map.

As a result, the cleaning route determination system according to the aspect of the present disclosure can keep holding accurate information regarding the areas inside the facility where dust is likely to have accumulated by reflecting, in a map indicating the areas where dust is likely to have accumulated, information regarding a cleaned area.

In the cleaning route determination system according to the aspect of the present disclosure, the terminal may further include an inputter. The map generator may update the dust accumulation map on a basis of information regarding an area cleaned by cleaning staff, the information being input to the inputter.

As a result, the cleaning route determination system according to the aspect of the present disclosure can keep holding accurate information regarding the areas where dust is likely to have accumulated by reflecting, in the map indicating the areas inside the facility where dust is likely to have accumulated, the information regarding an area cleaned by the cleaning staff.

In the cleaning route determination system according to the aspect of the present disclosure, the analyzer may use information regarding the updated dust accumulation map as an initial condition used to analyze the behavior of the particles.

As a result, the cleaning route determination system according to the aspect of the present disclosure can analyze the behavior of the particles on the basis of the accurate information regarding the areas inside the facility where dust is likely to have accumulated.

In the cleaning route determination system according to the aspect of the present disclosure, each of the one or more dust accumulation areas may be an area where at least a certain amount of dust has accumulated.

As a result, the cleaning route determination system according to the aspect of the present disclosure can efficiently clean a target space inside the facility by cleaning areas where at least the certain amount of dust has accumulated and collecting a maximum amount of dust inside the facility within the certain period of time.

In the cleaning route determination system according to the aspect of the present disclosure, the analyzer may analyze the behavior of the airflow using a lattice Boltzmann method.

As a result, the cleaning route determination system according to the aspect of the present disclosure can reduce a calculation load during the analysis of the behavior of the airflow.

In the cleaning route determination system according to the aspect of the present disclosure, the analyzer may analyze the behavior of the airflow using a k-c model.

As a result, the cleaning route determination system according to the aspect of the present disclosure can reduce a calculation load during the analysis of the behavior of the airflow.

In the cleaning route determination system according to the aspect of the present disclosure, the analyzer may analyze the behavior of the particles using a one-way model.

As a result, the cleaning route determination system according to the aspect of the present disclosure can reduce a calculation load during the analysis of the behavior of the airflow.

The cleaning route determination system according to the aspect of the present disclosure may further include a dust cluster calculator that classifies the one or more dust accumulation areas into one or more clusters using machine learning. The route calculator determines the first route using the one or more clusters.

As a result, the cleaning route determination system according to the aspect of the present disclosure can give, on the basis of statistical processing, discrete indices to the areas where dust has accumulated.

In the cleaning route determination system according to the aspect of the present disclosure, the route calculator may calculate the first route using at least a genetic algorithm, simulated annealing, or quantum annealing.

As a result, the cleaning route determination system according to the aspect of the present disclosure can reduce a possibility of local optima when obtaining an optimal cleaning route (optimal route).

A method for determining a cleaning route according to another aspect of the present disclosure includes receiving a calculation condition including information regarding an inside of a facility, analyzing, on a basis of the calculation condition, behavior of airflow and particles inside the facility, generating, on a basis of a result of the analysis, a dust accumulation map indicating one or more dust accumulation areas inside the facility and one or more dust amounts corresponding to the one or more dust accumulation areas, and determining, on a basis of the dust accumulation map, a first route from second routes. Each of the second routes is a route for a cleaner to pass through, within a certain period of time, at least one of the one or more dust accumulation areas. A total amount indicating a sum of dust amounts corresponding to dust accumulation areas included the first route is largest among total amounts corresponding to the second routes, each of the total amounts indicating a sum of dust amounts corresponding to dust accumulation areas included in each of the second routes.

As a result, the method for determining a cleaning route according to the other aspect of the present disclosure identifies areas inside the facility where dust is likely to have accumulated and determines a route for maximizing the amount of dust collected within the certain period of time in one or more of the identified areas where dust is likely to have accumulated. The cleaner can efficiently clean the inside of the facility by performing cleaning along the route.

Although the cleaning route determination system and the method for determining a cleaning route have been described on the basis of an embodiment, the present disclosure is not limited to this embodiment. The scope of one or more aspects may include modes obtained by modifying the embodiment in various ways conceivable by those skilled in the art and modes constructed by combining together components from different embodiments insofar as the spirit of the present disclosure is not deviated from.

A part or the entirety of functional blocks illustrated in the block diagram of FIG. 1 illustrating the cleaning route calculation system 1, the cleaning device 2, and the terminal 3 may be achieved by one or more electronic circuits including a semiconductor device, a semiconductor integrated circuit (IC), or a large-scale integration (LSI) circuit. The LSI circuit or the IC may be integrated on a single chip or may be achieved by a combination of chips. Functional blocks other than a storage device, for example, may be integrated on a single chip. Although terms "LSI" and "IC" are used here, another term may be used depending on a degree of integration, such as "system LSI", "very-large-scale integration (VLSI)", or "ultra-large-scale integration". A field-programmable gate array (FPGA), which is programmed after an LSI circuit is fabricated, or a reconfigurable logic device, in which connection relationships in an LSI circuit can be reconfigured or circuit sections in an LSI circuit can be set up, may be used for the same purpose.

Some or all of the functions or operations of the cleaning route calculation system 1, the cleaning device 2, and the terminal 3 illustrated in FIG. 1 can be achieved through software processing. In this case, software is stored in one or more non-transitory storage media such as read-only memories (ROMs), random-access memories (RAMs), optical discs, or hard disk drives and, when executed by a processor, causes the processor and peripheral devices to execute certain functions in the software. The cleaning route calculation system 1, the cleaning device 2, and the terminal 3 may each include one or more non-transitory storage media storing software, a processor, and necessary hardware devices including, for example, an interface. The software for achieving the cleaning route calculation system 1 causes the computer to perform the steps included in the flowchart of FIG. 10. The software for achieving the cleaning device 2 causes the computer to perform the steps included in the flowchart of FIG. 11. The software for achieving the terminal 3 causes the computer to perform the steps included in the flowchart of FIG. 12.

The present disclosure can be used for efficient cleaning in a large-scale commercial facility within a limited period of time, for example, as a cleaning route determination system.

What is claimed is:
1. A cleaning route determination system comprising:
   a calculation condition inputter configured to receive a calculation condition including information regarding an inside of a facility;
   an analyzer configured to perform an analysis of a behavior of airflow and particles inside the facility based on the calculation condition and an airflow speed induced by human movement;
   a map generator configured to generate a dust accumulation map based on the analysis by the analyzer, the dust accumulation map indicating one or more dust accu- mulation areas inside the facility and one or more dust amounts corresponding to the one or more dust accumulation areas; and a route calculator configured to determine a first route from second routes based on the dust accumulation map, wherein each of the second routes is a route for a cleaner to pass through at least one of the one or more dust accumulation areas within a certain period of time, and wherein a total amount indicating a sum of dust amounts corresponding to dust accumulation areas of the first route is largest among total amounts corresponding to the second routes, each of the total amounts indicating a sum of dust amounts corresponding to dust accumulation areas included in each of the second routes.

2. The cleaning route determination system according to claim 1, further comprising:

a terminal, wherein the map generator is configured to update the dust accumulation map based on information regarding a dust amount in a cleaned area, wherein the terminal is configured to receive the updated dust accumulation map, and wherein the terminal is configured to display the updated dust accumulation map.

3. The cleaning route determination system according to claim 2, wherein the terminal further includes an inputter, and wherein the map generator is configured to update the dust accumulation map based on information regarding an area cleaned by cleaning staff, the information being input to the inputter.

4. The cleaning route determination system according to claim 3, wherein the analyzer is configured to use information regarding the updated dust accumulation map as an initial condition to analyze the behavior of the particles.

5. The cleaning route determination system according to claim 1, wherein each of the one or more dust accumulation areas is an area where at least a certain amount of dust has accumulated.

6. The cleaning route determination system according to claim 1, wherein the analyzer is configured to perform the analysis of the behavior of the airflow using a lattice Boltzmann method.

7. The cleaning route determination system according to claim 1, wherein the analyzer is configured to perform the analysis of the behavior of the airflow using a k-ε model.

8. The cleaning route determination system according to claim 1, wherein the analyzer is configured to perform the analysis of the behavior of the particles using a one-way model.

9. The cleaning route determination system according to claim 1, further comprising:

a dust cluster calculator configured to classify the one or more dust accumulation areas into one or more clusters using machine learning, wherein the route calculator is further configured to determine the first route using the one or more clusters.

10. The cleaning route determination system according to claim 1, wherein the route calculator is further configured to calculate the first route using at least a genetic algorithm, simulated annealing, or quantum annealing.

11. A method for determination a cleaning route, the method comprising:

receiving a calculation condition including information regarding an inside of a facility;

analyzing behavior of airflow and particles inside the facility based on the calculation condition and an airflow speed induced by human movement;

generating a dust accumulation map based on the analyzing, the dust accumulation map indicating one or more dust accumulation areas inside the facility and one or more dust amounts corresponding to the one or more dust accumulation areas; and determining a first route from second routes based on the dust accumulation map, wherein each of the second routes is a route for a cleaner to pass through at least one of the one or more dust accumulation areas within a certain period of time, and wherein a total amount indicating a sum of dust amounts corresponding to dust accumulation areas of the first route is largest among total amounts corresponding to the second routes, each of the total amounts indicating a sum of dust amounts corresponding to dust accumulation areas included in each of the second routes.

* * * * *